United States Patent [19]

Burns et al.

[11] Patent Number: 5,236,240
[45] Date of Patent: Aug. 17, 1993

[54] SUN VISOR ATTACHMENT SYSTEM

[75] Inventors: Timothy J. Burns, St. Clair; Larry J. LaNore, Farmington; Delbert L. Arnold, St. Clair, all of Mich.

[73] Assignee: Emhart Inc., Newark, Del.

[21] Appl. No.: 931,182

[22] Filed: Aug. 17, 1992

Related U.S. Application Data

[63] Continuation-in-part of Ser. No. 838,585, Feb. 18, 1992, abandoned.

[51] Int. Cl.⁵ .................................................. B60J 3/02
[52] U.S. Cl. ........................... 296/97.9; 248/231.8; 248/289.1
[58] Field of Search ............ 296/97.9, 97.12, 97.13; 248/231.8, 278, 289.1

[56] References Cited

U.S. PATENT DOCUMENTS

| | | | |
|---|---|---|---|
| 3,017,217 | 1/1962 | Keating | 248/289.1 X |
| 4,729,590 | 3/1988 | Adams | 296/97.13 |
| 5,031,954 | 7/1991 | Peterson et al. | 296/97.13 X |

Primary Examiner—Dennis H. Pedder
Attorney, Agent, or Firm—Spencer T. Smith

[57] ABSTRACT

A sun visor assembly includes a grommet and a pin which will secure the grommet to a vehicular headliner. The grommet has a hollow head which receives a cylindrical plastic spring. A pin is used with the grommet to compress the spring to generate increased frictional forces with the pin which pass through the spring to hold the pin and the sun visor rod which is secured thereto in any desired position.

7 Claims, 2 Drawing Sheets

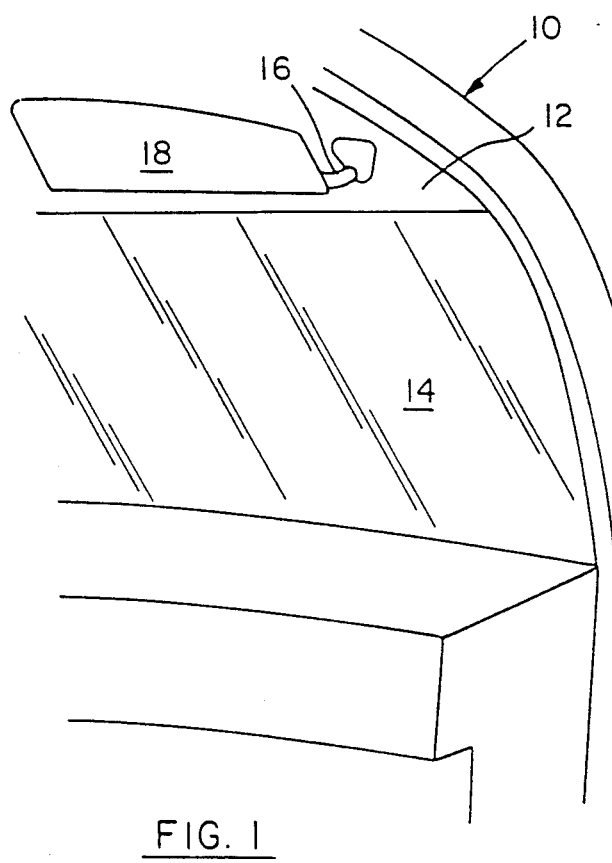
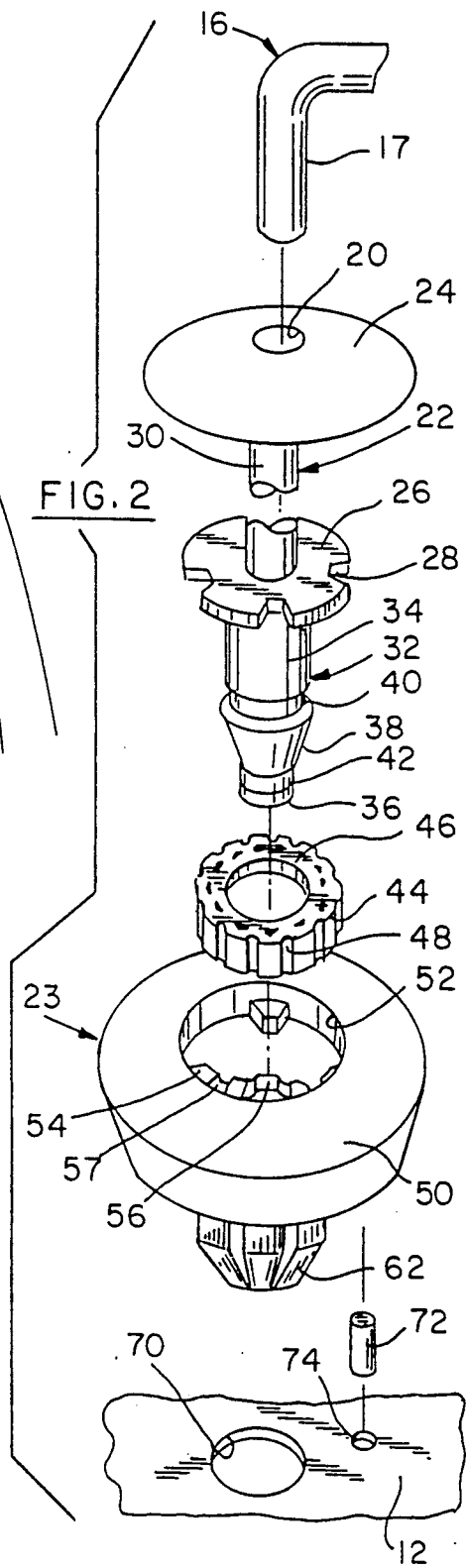

SUN VISOR ATTACHMENT SYSTEM

This application is a continuation-in-part of application Ser. No. 07/838,585, filed Feb. 18, 1992, now abandoned.

The present invention relates to vehicular sun visors.

Conventionally a sun visor is secured to a vehicle with a plurality of screws. This necessitates the use of assembly tooling which frequently will cause damage to the vehicle headliner and which makes the assembly process expensive.

It is accordingly an object of the present invention to provide a sun visor system which can be attached without any tooling.

Other objects and advantages of the present invention will become apparent from the following portion of this specification and from the accompanying drawings which illustrate in accordance with the mandate of the patent statutes a presently preferred embodiment incorporating the principles of the invention.

Referring to the drawings:

FIG. 1 is an oblique view of the headliner of a vehicle having a sun visor secured thereto;

FIG. 2 is an oblique exploded view of the sun visor attachment system made in accordance with the teachings of the present invention.

Figure 3:
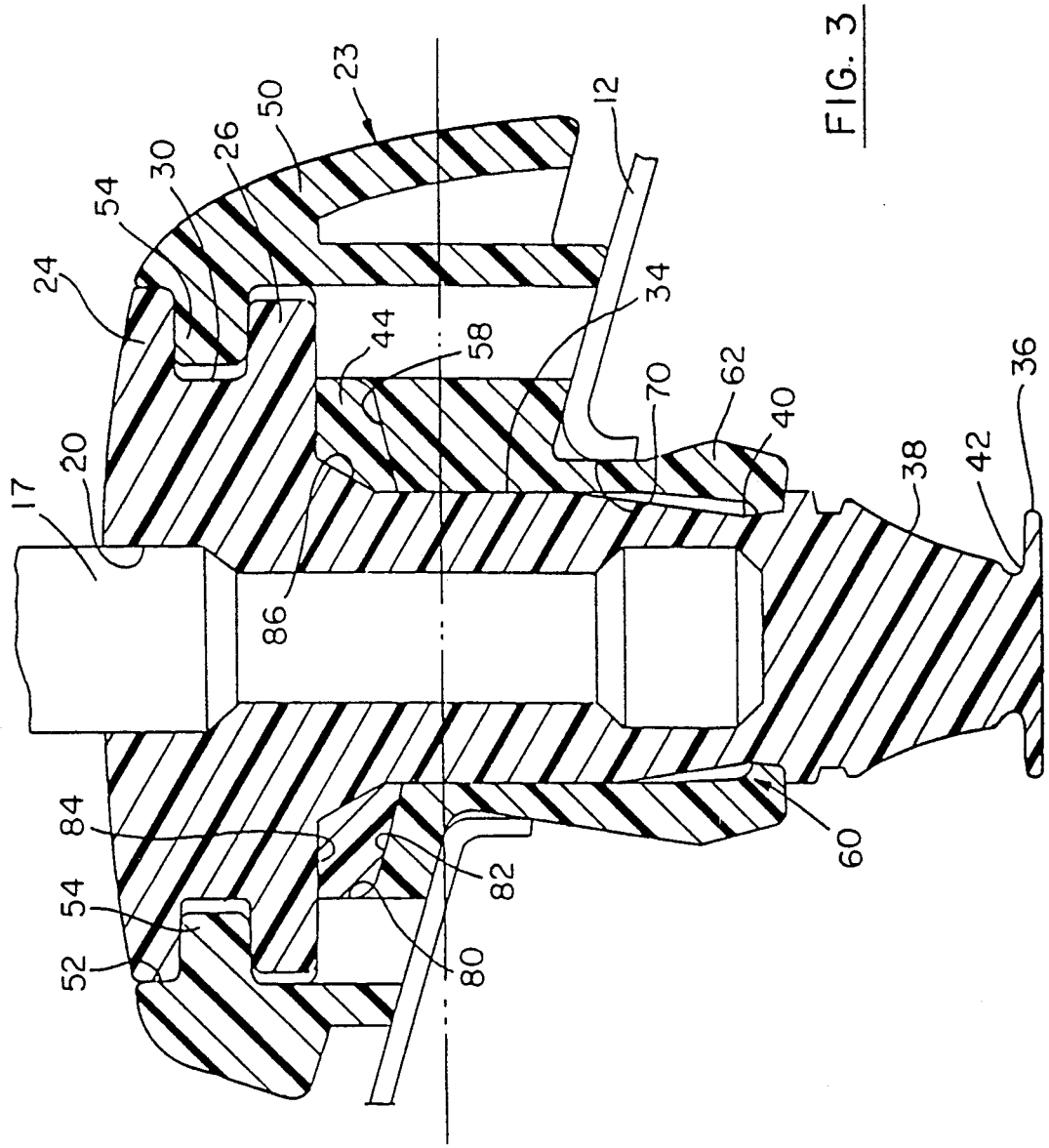
FIG. 3 is an elevational cross sectional view of the pin and grommet secured to the headliner.

A vehicle 10, whether it be a bus, car or truck has a headliner 12 above the front window 14 and a rod 16 to which a sunvisor 18 is attached, is secured to the headliner in front of the driver and front passenger. The end portion 17 of the rod 16 is insert welded within an axial bore 20 defined in the top of a plastic pin member 22 of a pin and grommet 23 fastener. The pin includes a cap or umbrella 24, a disc 26 having a plurality of keyways 28, a short reduced diameter post section 30 interconnecting the cap 24 with the disc 26 and a cylindrical end 32 having a cylindrical portion 34 adjacent the disc and a reduced diameter cylindrical portion 36 at the end of the pin 22 which is connected to the enlarged cylindrical portion 34 by a taper 38. An annular recess 40 is defined on the enlarged cylindrical portion adjacent the taper 38 and an annular groove 42 is defined on the reduced diameter portion 36. A cylindrical spring 44 made of a thermoplastic material such as Santoprene TM and having a through hole 46 smaller than the enlarged cylindrical pin portion 34 of the pin 22 is forced onto the enlarged cylindrical pin portion and is located against the disc 26. The outer diameter of the cylindrical spring 44 has a number of grooves or serrations 48.

The grommet 23 (FIGS. 2 and 3) has a head portion 50 which has a recessed opening 52 at the top including a plurality of outwardly projecting keys 54 matching the keyways 28 in the pin disc 26. The rod 16 will be secured to the pin 22 at a selected orientation relative to the disc so that the pin can be inserted into or removed from the grommet only when the sun visor is located in a selected position. In the event that the sun visor is secured to the headliner as shown in FIG. 1, this position might be extended out through the open doorway.

The grommet and pin can be interconnected prior to installation by pushing the pin into the grommet until the finger 62 latching ends 60 engage the groove 42 at the end of the pin. The fingers are unstressed when the pin and grommet are thus interconnected so that the fingers can be inserted into a suitable hole 70 in the headliner 12.

The pin will then be inserted until the spring 44 is located within a cylindrical pocket 56 within the hollow grommet. This pocket also has a plurality of vertical peripheral grooves 57 to cooperate with the spring grooves 48 to inhibit rotation of the spring. To complete the installation procedure the pin is pushed in to compress the spring 44 between the disc 26 and the bottom shelf 58 of the cylindrical grooved pocket 56, at which time the handle and hence the disc can then be rotated to lock the pin in the grommet with the spring compressed. The latches 60 defined at the end of the grommet fingers 62 will catch in the annular groove 40 of the enlarged cylindrical portion 34 to clamp the headliner between the grommet head portion 50 and the extended fingers 62. A locating pin 72 may be defined to project downwardly from the bottom surface of the head portion for insertion into a orienting hole 74 in the headliner to assure proper installation.

As can be seen from FIG. 3 the spring receiving pocket which is partially defined by the grommet pocket 58 and partially defined by the pin is not rectangular in cross section as is the spring. The side wall 80 of the pocket is vertical while the bottom surface 82 slopes downwardly towards the pin cylindrical portion 34. The remainder of the pocket is defined by the horizontal bottom surface 84 of the disc and an inwardly tapered surface 86 which joins the bottom surface 84 with the cylindrical surface 34. As the spring is compressed to fit into this pocket sufficient frictional forces will be generated between the spring and the tapered surface 86 to maintain the rod wherever positioned while permitting relocation as desired.

The desired compression may also be achieved without the use of the disc 26 and keys 54. In this event, the lower surface of the cap 24 has a surface which will engage the top of the spring and will compress the spring when the pin is displaced downwardly sufficiently to locate the fingers 62 in the locking groove 40.

We claim:

1. A sun visor assembly to be secured to a headliner having a selectively sized through hole comprising
  a grommet including a hollow head having a recessed opening defining a peripheral wall surface at the top and a plurality of fingers extending from the bottom of the head, each having a latching portion,
  a plurality of keys projecting inwardly from said wall surface and spaced inwardly from the top of said head
  said hollow head including a cylindrical axial pocket coaxial with and opening into said recessed opening,
  pin means including
    a cap for closing the top opening of said grommet,
    a disc member including a corresponding plurality of keyways selectively configured and located to match with said keys,
    post means on one side of said disc member for coaxially connecting said cap and said disc member,
    a cylindrical pin extending axially from the other side of said disc member and having a plurality of annular recesses defined therearound for receiving the latching portion of said fingers when said fingers are in contact therewith resulting in the fingers being urged outwardly to clamp the headliner between said hollow head and said fingers or to provide sufficient hold force between the said fingers and annular recess of the cylindrical pin to facilitate the shipping and handling of said sun visor assembly as one unit, and thermal plastic cylindrical spring means located within said pocket between said disc member and said hollow head and around said cylindrical pin, the height of said cylindrical spring means being selected so that said spring means will be compressively located between said disc member and a portion of said hollow head when said disc is displaced past said keys and rotated therebeneath to provide sufficient resistance to rotation as required in the typical sun visor assembly operation, said keys being selectively located to prevent the release of said pin means throughout the normal displacement range of the said pin means, means for inhibiting the rotation of said spring means relative to said grommet, and a sun visor rod secured to said pin means.

2. A sun visor assembly according to claim 1, wherein said inhibiting means comprises a series of axial grooves on said spring means and a series of axial grooves on said pocket.

3. A sun visor assembly according to claim 2, said keys further comprising means for preventing the insertion of said pin means into said grommet except at a selected orientation relative thereto.

4. A sun visor assembly according to claim 1, wherein said cylindrical pin has an annular surface engaging said compressed spring, said annular surface being tapered outwardly towards the top of said grommet.

5. A sun visor assembly to be secured to a headliner having a selectively sized through hole comprising a grommet including a hollow head having a recessed opening defining a peripheral wall surface at the top and a plurality of fingers extending from the bottom of the head, each having a latching portion, said hollow head including a cylindrical axial pocket coaxial with and opening into said recessed opening, thermal plastic cylindrical spring means located within said pocket, pin means including means for engaging the top surface of said spring means, a cylindrical pin extending axially from said engaging means and having an annular recess defined therearound for receiving the latching portion of said fingers when said fingers are in contact therewith resulting in the fingers being urged outwardly to clamp the headliner between said hollow head and said fingers, means for inhibiting the rotation of said spring means relative to said grommet, the height of said cylindrical spring means being selected so that said spring means will be compressively located within said pocket when said fingers are located within said annular recess to provide resistance to rotation, and a sun visor rod secured to said pin means.

6. A sun visor assembly according to claim 5, wherein said inhibiting means comprises a series of axial grooves on said spring means and a series of axial grooves on said pocket.

7. A sun visor assembly according to claim 5, wherein an annular surface of said cylindrical pin engaging said compressed spring is tapered outwardly towards the top of said grommet.

* * * * *